United States Patent [19]

VanSweden

[11] Patent Number: 5,183,287

[45] Date of Patent: Feb. 2, 1993

[54] SUSPENSION SYSTEM FOR ROAD WHEEL OF A TRACK LAYING VEHICLE

[75] Inventor: Harry VanSweden, Utica, Mich.

[73] Assignee: General Dynamics Land Systems, Inc., Sterling Heights, Mich.

[21] Appl. No.: 737,762

[22] Filed: Jul. 30, 1991

[51] Int. Cl.⁵ .............................................. B60G 11/26
[52] U.S. Cl. ...................................... 280/705; 180/9.1; 180/9.5; 180/9.54; 188/321.11; 267/256; 280/708; 280/714
[58] Field of Search ........................ 180/9.1, 9.5, 9.52, 180/9.54; 280/705, 708, 714; 188/321.11; 267/256

[56] References Cited

U.S. PATENT DOCUMENTS

| | | |
|---|---|---|
| 2,240,121 | 4/1941 | Patterson . |
| 2,551,930 | 5/1951 | Crabtree . |
| 3,374,005 | 3/1968 | Donlon et al. . |
| 4,031,967 | 6/1977 | Atherton et al. . |
| 4,156,536 | 5/1979 | Brandstadter ................. 280/705 |
| 4,447,073 | 5/1984 | Brandstadter . |
| 4,537,422 | 8/1985 | O'Rourke . |
| 4,700,969 | 10/1987 | Joseph ................................ 280/705 |
| 4,700,970 | 10/1987 | Joseph . |
| 4,721,327 | 1/1988 | Chauveau et al. ............ 280/705 |
| 4,721,328 | 1/1988 | Chaveau et al. . |
| 4,768,628 | 9/1988 | Philippe et al. . |

Primary Examiner—Mitchell J. Hill
Attorney, Agent, or Firm—Brooks & Kushman

[57] ABSTRACT

A suspension system (28) for a track laying vehicle includes a support arm (30) that defines a cavity (36) and has a first end (32) about which the arm pivots under the control of a stationary crank arm (38) and a cylinder of (42) supported for swiveling movement by a swivel bearing (46). The cylinder (42) has a piston (48) that is connected to the crank arm (38) and which operates to compress suppression liquid within the cavity (36) to thereby control jounce and rebound movement of the support arm.

13 Claims, 3 Drawing Sheets

SUSPENSION SYSTEM FOR ROAD WHEEL OF A TRACK LAYING VEHICLE

TECHNICAL FIELD

This invention relates to a suspension system for supporting a road wheel of a track laying vehicle for jounce and rebound movement.

BACKGROUND ART

Track laying vehicles such as armored tanks conventionally include a track that is driven by a rear drive sprocket from a front idler sprocket below road wheels that are supported by associated suspension systems for jounce and rebound movement so as to thus support the vehicle hull as a sprung mass. One present way of supporting the road wheels is through the use of torsion bars that extend between the opposite sides of the vehicle hull through the crew compartment and thus must be accommodated for in the design of the vehicle.

Road wheels for track laying vehicles have also included gas operated suspension systems such as disclosed by U.S. Pat. Nos.: 3,374,005 Donlon et al; 4,447,073 Brandstadter; 4,537,422 O'Rourke; 4,721,328 Chauveau et al; and 4,768,628 Philippe et al. Such gas operated suspension systems must be maintained against gas leakage and temperature variations that affect the spring rate with which the associated road wheel is supported.

Other vehicle suspension apparatus noted during the investigation conducted for the present application are disclosed by U.S. Pat. Nos.: 2,551,930 Crabtree and 4,700,970 Joseph.

Nonanalogous art that is unrelated to vehicle wheel suspension but which was noted during the investigated conducted for the present application includes U.S. Pat. Nos.: 2,240,121 Patterson which discloses a pump having a cylinder supported by a resilient sleeve for swiveling movement and 4,031,967 Atherton et al which discloses a motor grater having a blade that is supported by a cylinder mounted on a spherical bearing.

DISCLOSURE OF INVENTION

An object of the present invention is to provide an improved suspension system for a road wheel of a track laying vehicle by a suspension liquid so as to eliminate problems associated with prior art torsion bar and gas suspension systems previously utilized with road wheels of track laying vehicles.

In carrying out the above and other objects, the suspension system for a road wheel of a track laying vehicle is constructed in accordance with the present invention to include a support arm having a first end that is mounted on the vehicle for pivotal jounce and rebound movement about a support axis. The support arm has a second end for supporting a road wheel spindle and also includes a cavity for receiving a suspension liquid. A stationary crank arm of the suspension system has a connection location spaced from the pivotal axis of the support arm. A cylinder of the suspension system includes a cylinder housing having a swivel bearing that mounts the cylinder housing for swiveling movement on the support arm in communication with the cavity. A piston of the cylinder is slidably received within the cylinder housing in a sealed relationship and has a connection to the connection location of the crank arm such that the cylinder housing swivels with respect to the support arm as the piston slides within the cylinder housing to compress the suspension liquid upon jounce pivoting of the support arm in order to thereby restrict the jounce pivoting of the support arm. The suspension liquid also operates on the piston to restrict rebound pivoting of the support arm.

In its preferred construction, the suspension system includes a hub for pivotally mounting the first end of the support arm on the vehicle. The support arm of this preferred construction includes a hollow housing in which the cavity and crank arm as well as the cylinder are located. Antifriction bearings preferably mount the housing of the support arm with respect to the vehicle to provide the pivotal support of the first end of the support arm. The suspension system preferably has the housing constructed to include inner and outer housing portions and also preferably includes inner and outer antifriction bearings that respectively mount the inner and outer housing portions to provide the pivotal support of the first end of the support arm. The stationary crank arm of the suspension system is mounted by the hub and supports the inner and outer antifriction bearings that mount the inner and outer housing portions to provide the pivotal support of the first end of the support arm.

Different constructions of the swivel bearing are disclosed. In one construction, the swivel bearing is constructed to include an annular support embodied by an annular bearing member mounted by the support arm and to also include a spherical bearing member that supports the cylinder housing and is received within and supported for swiveling movement by the annular bearing member. In another construction, the swivel bearing is constructed to include a resilient annular support mounted by the support arm and to also include a bearing member that supports the cylinder housing and is received within and supported for swiveling movement by the resilient annular support.

In each disclosed construction, a positioner of the suspension system extends between the stationary crank arm and the bearing member to swivel the bearing member and the cylinder housing during the jounce and rebound movement. A lost motion connection connects the positioner and the stationary crank arm and preferably includes a pair of slotted arms on the positioner between which the stationary crank arm is received as well as including a pair of cams that are mounted on the stationary crank arm and respectively received by the pair of slotted arms to swivel the bearing member and the cylinder housing during the jounce and rebound movement.

It is also possible for the suspension system to include a divider that divides the cavity of the support arm into a first cavity portion in direct communication with the piston of the cylinder and a second cavity portion that is communicated with the piston of the cylinder through the first cavity portion. A valve permits flow of the suspension liquid between the first and second cavity portions at a restricted rate to provide dampening of the jounce and rebound movement of the support arm. In its preferred construction, the divider comprises an elongated container in which the cylinder housing is received and which has one end mounted by the support arm adjacent the spherical bearing and another end that mounts the valve which dampens the jounce and rebound movement of the support arm.

The objects, features and advantages of the present invention are readily apparent from the following de-

BEST MODES FOR CARRYING OUT THE INVENTION

Figure 1:
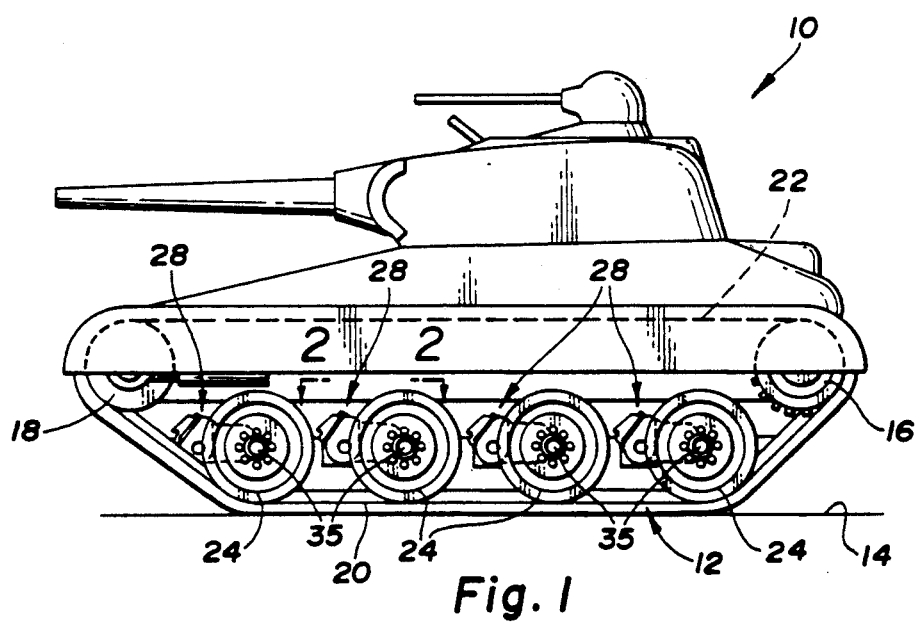
FIG. 1 is a side elevational view of a track laying vehicle which includes a suspension system constructed in accordance with the present invention to support a road wheel of the vehicle.
Figure 2:
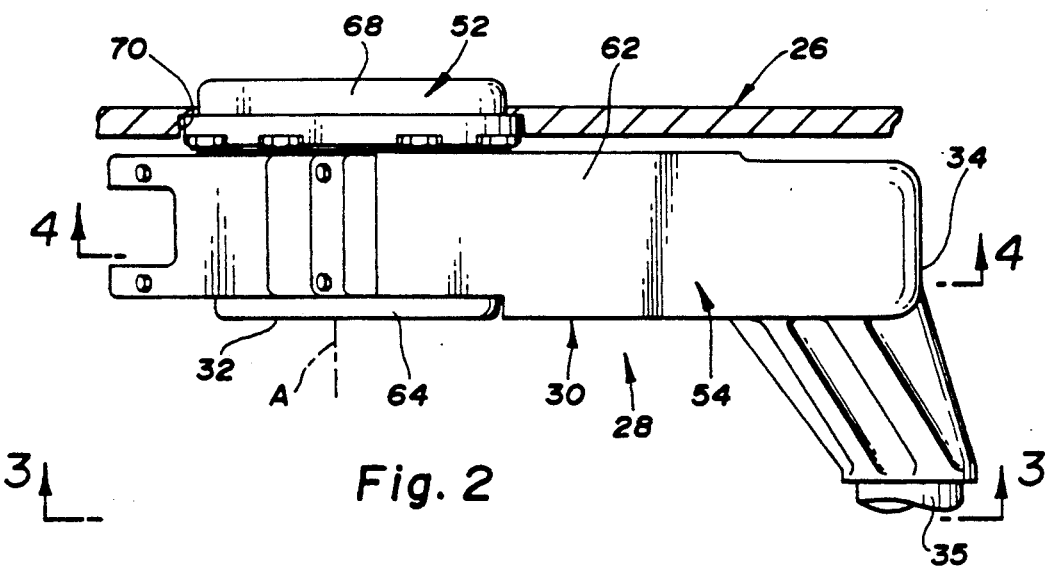
FIG. 2 is top plan view of the suspension system taken along the direction of line 2—2 in FIG. 1 but at an enlarged scale.

With reference to FIG. 1, a track laying vehicle generally indicated by 10 is embodied by a tank having a track 12 that engages the ground 14. This track 12 may be of any conventional type and is moved between a drive sprocket 16 and an idler sprocket 18 along a ground reach 20 and a return reach 22. Road wheels 24 of the vehicle are supported on its hull 26 by associated suspension systems 28 that are constructed in accordance with the present invention as is hereinafter more fully described. These road wheels 24 engage the ground reach 20 of the track 12 and are supported by the suspension systems 28 for jounce and rebound movement so as to mount the vehicle hull 26 in a sprung manner as well as facilitating vehicle travel over rough terrain.

Figure 3:
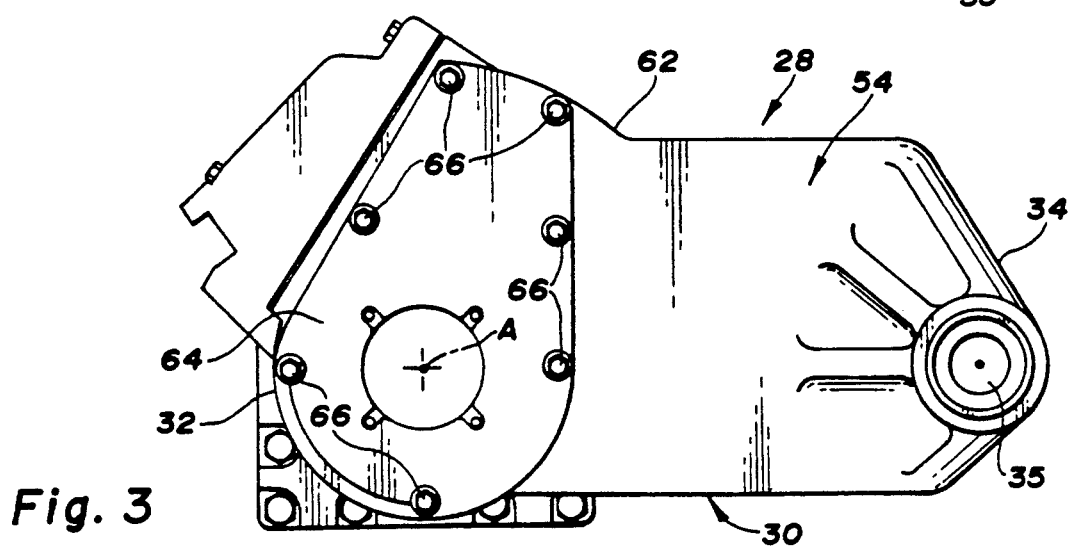
FIG. 3 is a side elevational view of the suspension system taken along the direction of line 3—3 in FIG. 2.
Figure 4:
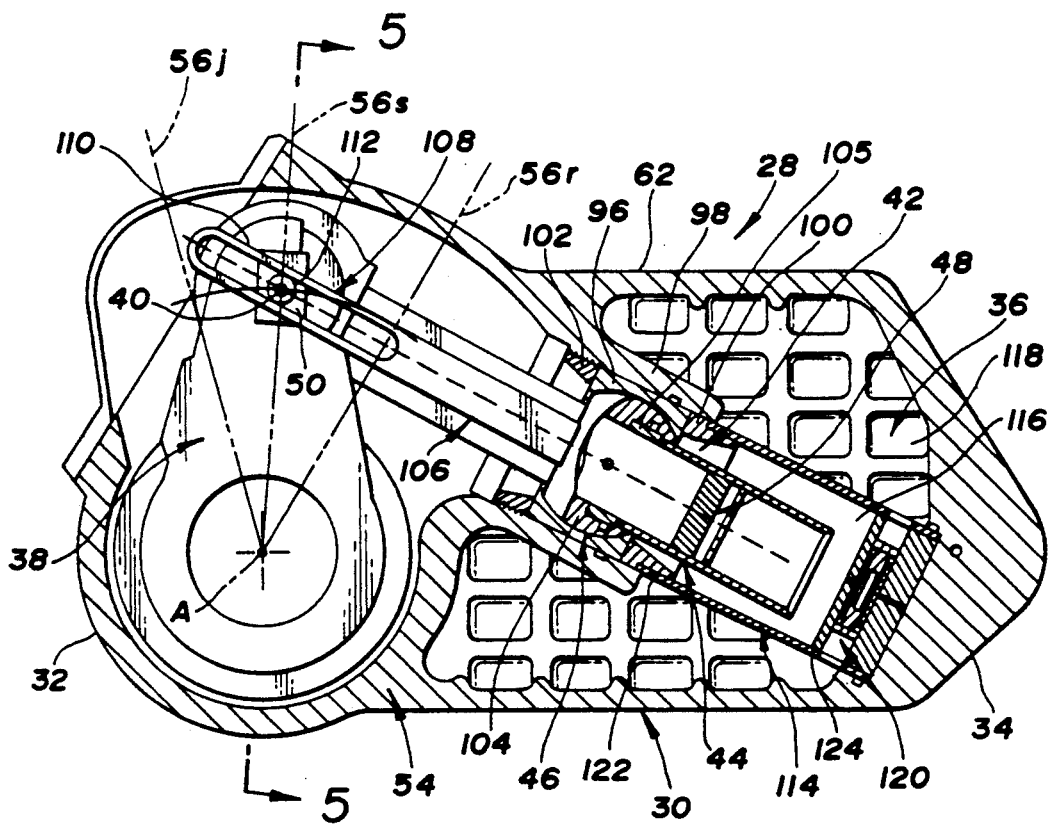
FIG. 4 is a sectional view taken through the suspension system along the direction of line 4—4 in FIG. 2.

As illustrated by combined reference to FIGS. 2 through 5, each suspension system 28 includes a support arm 30 having a first end 32 that is mounted on the vehicle for pivotal jounce and rebound movement about a support axis A. Support arm 30 also has a second end 34 for supporting a road wheel spindle 35 on which an associated road wheel is mounted. As shown in FIG. 4, the support arm 30 also includes a cavity 36 for receiving a suspension liquid that fills the cavity and functions during operation of the suspension system as is hereinafter more fully described. Best results are achieved when the suspension liquid utilized is a silicone fluid that has much greater compressibility than most liquids. One silicone fluid utilized to provide the best results observed is sold by Dow Corning Corporation of Midland, Mich., United States of America under the designation "Dow Corning 200".

As shown by continuing reference to FIG. 4, suspension system 28 includes a stationary crank arm 38 having a connection location 40 spaced from the pivotal axis A of the support arm. A cylinder 42 of the suspension system is illustrated in FIG. 4 to the right of the crank arm 38 and includes a cylinder housing 44 having a swivel bearing 46 that mounts the cylinder housing for swiveling movement on the support arm in communication with the cavity 36. Cylinder 42 also includes a piston 48 slidably received within the cylinder housing 44 in a sealed relationship and having a connection 50 of a suitable pivotal construction to the connection location 40 of the crank arm 38 such that the cylinder housing 44 swivels with respect to the support arm as the piston slides within the cylinder housing to compress the suspension liquid upon jounce pivoting of the support arm in order to thereby restrict the jounce pivoting. The suspension liquid also operates on the piston 48 to restrict rebound pivoting of the support arm 30. The swiveling support of the cylinder 42 by the swivel bearing 46 enables the support arm 30 to withstand lateral forces to which the suspension system is subjected during use.

Figure 5:
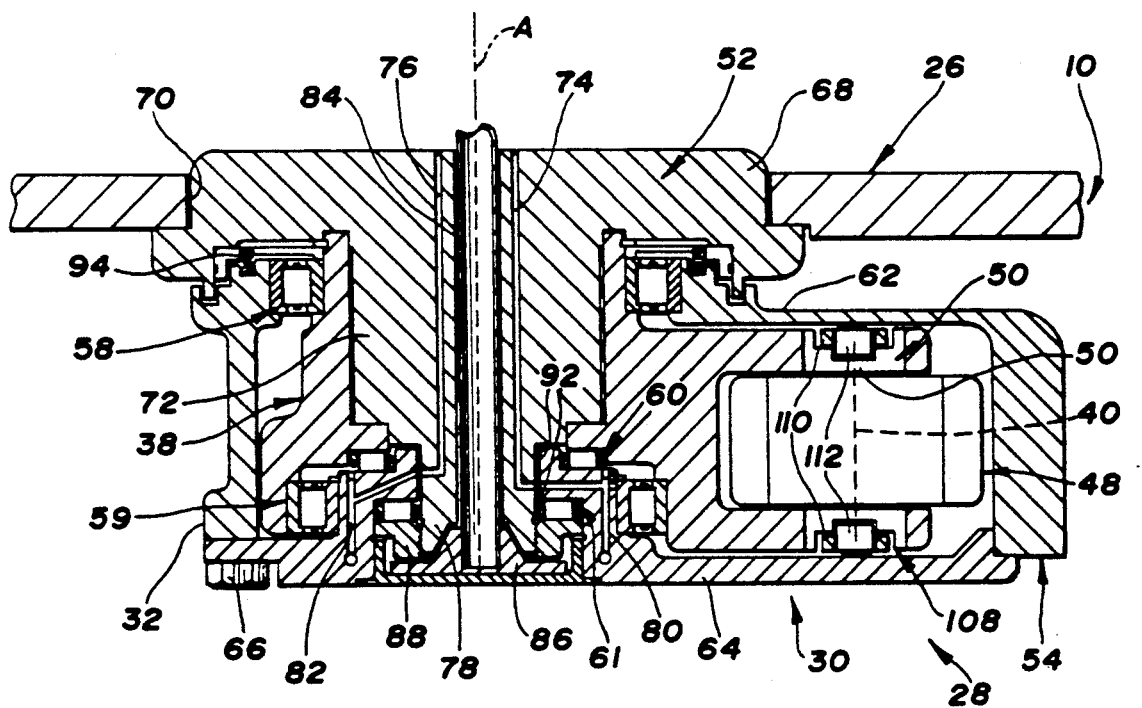
FIG. 5 is a sectional view taken through the suspension system generally along the direction of line 5—5 in FIG. 4 to further illustrate its construction.

As best illustrated in FIG. 5, suspension system 28 includes a hub 52 for pivotally mounting the first end 32 of the support arm 30 on the vehicle such as at the side of the hull 26 as illustrated. This hub 52 thus mounts the support arm 30 for pivotal movement about the axis A. The support arm 30 mounted by hub 52 includes a hollow housing 54 in which the cavity 36 and the stationary crank arm as well as the cylinder 42 are located as shown in FIGS. 4 and 5. More specifically, the housing 54 as shown in FIG. 4 has a right end that receives the cylinder 42 within the cavity 36 and has a left end in which the stationary crank arm 38 is mounted in a generally upwardly extending orientation from the pivotal axis A. In a stationary position, the support arm 30 is located with respect to the stationary crank arm 38 as shown by reference line 56s. Upon jounce movement, the support arm 38 pivots counterclockwise about axis A with the crank arm 30 remaining stationary such that the housing 54 pivots toward the extreme position of jounce travel shown by reference line 56j. Rebound movement takes place as the housing 54 of support arm 30 pivots clockwise about axis A with respect to the crank arm 38 and moves toward the extreme position of rebound travel illustrated by reference line 56r. Of course, the extent of both the jounce movement and the rebound movement is controlled by the dynamics of the vehicle travel and may be somewhat less than the extremes illustrated.

As illustrated in FIG. 5, the suspension system 28 includes inner and outer antifriction bearings 58 and 59 that mount the housing 54 of the support arm 30 with respect to the vehicle to provide the pivotal support of the first end 32 of the support arm 30, and the suspension system also includes inner and outer antifriction thrust bearings 60 and 61 that resist axial loadings between the support arm and the vehicle. Housing 54 includes inner and outer housing portions 62 and 64, respectively, that are secured to each other by bolts 66 as shown in FIG. 3. These inner and outer housing portions 62 and 64 define the generally hollow construction of housing 54 in which the cylinder 42, cavity 36 and the stationary crank arm 38 are located as illustrated in FIGS. 4 and 5.

As shown in FIG. 5, the hub 52 has a mounting portion 68 that is mounted in any suitable manner on the vehicle hull 26 such as within an opening 70 of the hull and also includes an intermediate hub portion 72 on which the stationary crank arm 38 is fixedly mounted in any suitable manner so as to be maintained in the upwardly extending position illustrated in FIG. 4 against rotation about axis A. This stationary crank arm 38 supports the antifriction bearings 58, 59, 60 and 61 that mount the inner and outer housing portions 62 and 64 to provide the pivotal support of the first end 32 of the support arm 30. More specifically, the antifriction bearing 58 has its small race supported by the crank arm 38 and its large race supporting the inner housing portion 62 with caged roller elements supporting the races with respect to each other. Furthermore, the antifriction bearing 59 has its large race supported by the crank arm 38 and its small race supporting the outer housing portion 64 with caged roller elements providing the support between the races. Hub 52 also has oil ports 74 and 76 that extend from its mounting portion 68 through the intermediate hub portion 72 to an outer end 78 to feed associated oil ports 80 and 82 of the outer housing portion 64 in order to control the pressure of the suspension liquid within the cavity 36 and hence the rotational position at which the cylinder 42 maintains the suspension arm 30 in a rest condition. Along the axis A, the hub 52 includes a tube 84 through which suitable communications can extend to the interior of the support arm housing 54 in order to sense and/or control the rebound and jounce movement. This tube 84 has an outer end that mounts a cap 86 through which the communication wires can extend radially from the axis A. A nut 88 is located inboard from the cap 86 and is threaded onto the outer end 78 of the hub 52 to secure the arm housing 54 on the hub with the antifriction thrust bearings 60 and 61 captured as shown and with annular seals 92 and 94 preventing the escape of the suspension liquid adjacent the fluid ports and the cavity as previously described.

As illustrated in FIG. 4, the swivel bearing 46 includes a support embodied by an annular bearing member 96 mounted on the support arm 32 within an annular housing flange 98 adjacent the cavity 36. An annular stop 100 is fixedly mounted on the housing flange 98 and engages one end of the annular bearing member 96 whose other end is secured by a nut 102 that is threadedly secured to the housing flange 98. Swivel bearing 46 also includes a spherical bearing member 104 that supports the cylinder housing 44 in a suitable manner and that has an annular seal 105 for slidably sealing with the piston 48. Spherical bearing member 104 is received within and supported for swiveling movement by the annular bearing member 96. A positioner 106 extends between the stationary crank arm 38 and the spherical bearing member 104 to swivel the spherical bearing member and hence the cylinder housing during the jounce and rebound movement such that the force causing this swiveling is not transmitted through the piston 48 during the sliding of the piston within the cylinder housing 44.

As illustrated by combined reference to FIGS. 4 and 5, a lost motion connection 108 of the suspension system connects the positioner 106 and the stationary crank arm 38 adjacent the location 40 where the other connection 50 connects the piston 48 to the crank arm. This lost motion connection 108 preferably includes a pair of slotted arms 110 of the positioner 106 between which the stationary crank arm 38 is received, and the lost motion connection also includes a pair of rollers 112 that function as cams and are mounted on the stationary crank arm and respectively received within the elongated slots of the pair of slotted arms 110 to swivel the spherical bearing member 104 and the cylinder housing 44 shown in FIG. 4 during the jounce and rebound movement. This lost motion connection 108 thus accommodates for sliding of the piston 48 within the cylinder housing 44 while still ensuring that the spherical bearing member 104 and the cylinder housing 44 are properly angularly positioned so that the piston does not have to carry the force that causes the swiveling.

As shown in FIG. 4, suspension system 28 also includes a divider 114 that divides the cavity 36 of the support arm into an first cavity portion 116 in direct communication with the piston 48 of the cylinder 42 and a second cavity portion 118 that is communicated with the piston of the cylinder through the first cavity portion. A valve 120 permits flow of the suspension liquid between the first and second cavity portions 116 and 118 at a restricted rate to provide dampening of the jounce and rebound movement of the support arm. Thus, the liquid pressure surge as the piston 48 is extended within the cylinder housing 44 during jounce movement is transmitted from the first cavity portion 116 through the valve 120 to the second cavity portion 118 over a period of time, and the piston retraction during rebound movement draws the suspension liquid into the first cavity portion 116 from the second cavity portion 118 through the valve 120 so as to restrict the rebound movement. The net effect of the operation of the valve 120 is to thus provide dampening of the jounce and rebound movement. In the preferred construction, the divider 114 comprises an elongated container in which the cylinder housing 44 is received and which has one end 122 mounted by the support arm 30 adjacent the spherical bearing 46. More specifically, the one end 122 of the container that defines the divider is mounted by the stop 100 on the housing flange 98 of the support arm. Another end 124 of the container that provides the divider is suitably secured with respect to the housing 54 and mounts the valve 120 which restricts the liquid flow to dampen the jounce and rebound movement of the support arm as described above.

It should be noted that the dampening does not necessarily have to be provided on each suspension system 28 of the vehicle in that dampening of less than all of the road wheels can provide the requisite dampening of the sprung vehicle mass. Furthermore, while the dampening can be provided by other independent shock absorber units or constructions, it is preferable to utilize the construction illustrated within the support arm housing as described above.

Figure 6:
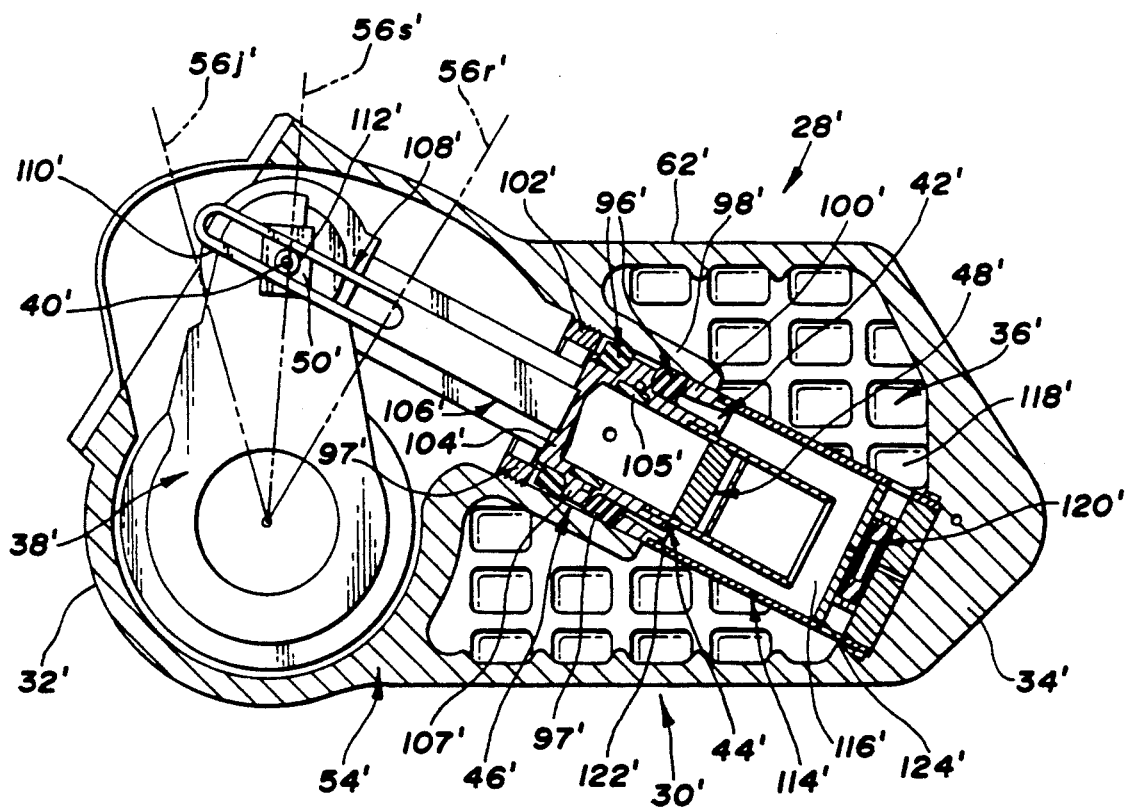
FIG. 6 is a sectional view similar to FIG. 4 of another embodiment.

With reference to FIG. 6, another embodiment of the suspension system of a modified construction is illustrated and has like primed reference numerals identifying the like components thereof such that most of the previous description is applicable and need not be repeated. This modified embodiment of the suspension system 28' has a swivel bearing 46' including a resilient annular support 96' embodied by a pair of resilient annular rings 97'. An annular stop 100' is fixedly mounted on the housing flange 98' and engages one of the annular rings 97', while a nut 102' is threadedly secured to the housing flange 98' and engages the other annular ring 97' from the opposite side. Swivel bearing 46' also includes a bearing member 104' that supports cylinder housing 44' in a suitable manner is received within and supported for swiveling movement by the resilient annular support 96'. More specifically, the bearing member 104' has an annular flange 107' that is captured between the two resilient annular rings 97' to thus support the cylinder housing 44' for the swiveling movement.

The modified embodiment of the suspension system 28' illustrated in FIG. 6 like the previously described embodiment has a positioner 106' that extends between the stationary crank arm 38' and the bearing member 104' to swivel the bearing member and hence the cylinder housing 44' during the jounce and rebound movement such that the force causing the swiveling is not transmitted through the piston 48' during the sliding of the piston within the cylinder housing.

While the best modes for carrying out the invention have been described in detail, those familiar with the art to which this invention relates will recognize various alternatives, designs and embodiments for practicing the invention as described by the following claims.

What is claimed is:

1. A suspension system for a road wheel of a track laying vehicle, comprising: a support arm having a first end that is mounted on the vehicle for pivotal jounce and rebound movement about a support axis; the support arm having a second end for supporting a road wheel spindle and also including a cavity for receiving a suspension liquid; a stationary crank arm having a connection location spaced from the pivotal axis of the support arm; a cylinder including a cylinder housing having a swivel bearing that mounts the cylinder housing for swiveling movement on the support arm in communication with the cavity; and the cylinder also including a piston slidably received within the cylinder housing in a sealed relationship and having a connection to the connection location of the crank arm such that the cylinder housing swivels with respect to support arm as the piston slides within the cylinder housing to compress the suspension liquid upon jounce pivoting of the support arm in order to thereby restrict the jounce pivoting, and the suspension liquid also operating on the piston to restrict rebound pivoting of the support arm.

2. A suspension system as in claim 1 which further includes a hub for pivotally mounting the first end of the support arm on the vehicle, and the support arm including a hollow housing in which the cavity and crank arm as well as the cylinder are located.

3. A suspension system as in claim 2 which further includes antifriction bearings that mount the housing of the support arm with respect to the vehicle to provide the pivotal support of the first end of the support arm.

4. A suspension system as in claim 3 whose housing includes inner and outer housing portions and which includes inner and outer antifriction bearings that respectively mount the inner and outer housing portions to provide the pivotal support of the first end of the support arm.

5. A suspension system as in claim 4 wherein the stationary crank arm is mounted by the hub and supports the inner and outer antifriction bearings that mount the inner and outer housing portions to provide the pivotal support of the first end of the support arm.

6. A suspension system as in claim 1 wherein the swivel bearing includes an annular support embodied by an annular bearing member mounted by the support arm, the swivel bearing also including a spherical bearing member that supports the cylinder housing and is received within and supported for swiveling movement by the annular bearing member, and a positioner that extends between the stationary crank arm and the spherical bearing member to swivel the spherical bearing member and the cylinder housing during the jounce and rebound movement.

7. A suspension system as in claim 1 wherein the spherical bearing includes a resilient support mounted by the support arm and also includes a bearing member that supports the cylinder housing and is received within and supported for swiveling movement by the resilient annular support, and a positioner that extends between the stationary crank arm and the bearing member to swivel the bearing member and the cylinder housing during the jounce and rebound movement.

8. A suspension system as in claim 6 or 7 further including a lost motion connection that connects the positioner and the stationary crank arm.

9. A suspension system as in claim 8 wherein the lost motion connection includes a pair of slotted arms of the positioner, the stationary crank arm being received between the pair of slotted arms, and the lost motion connection also including a pair of cams that are mounted on the stationary crank arm and respectively received by the pair of slotted arms to swivel the bearing member and the cylinder housing during the jounce and rebound movement.

10. A suspension system as in claim 1 or 4 further including a divider that divides the cavity of the support arm into a first cavity portion in direct communication with the piston of the cylinder and a second cavity portion that is communicated with the piston of the cylinder through the first cavity portion, and a valve that permits flow of the suspension liquid between the first and second cavity portions at a restricted rate to provide dampening of the jounce and rebound movement of the support arm.

11. A suspension system as in claim 10 wherein the divider comprises an elongated container in which the cylinder housing is received and which has one end mounted by the support arm adjacent the spherical bearing and another end that mounts the valve which dampens the jounce and rebound movement of the support arm.

12. A suspension system for a road wheel of a track laying vehicle, comprising: a support arm having a hollow housing including a first end that is mounted on the vehicle for pivotal jounce and rebound movement about a support axis; the housing of the support arm including a second end for supporting a road wheel spindle and also defining a cavity for receiving a suspension liquid; a stationary crank arm received within the hollow housing of the support arm adjacent the first end thereof and having a connection location spaced from the pivotal axis of the support arm; a cylinder including a cylinder housing having a swivel bearing; the swivel bearing including an annular support mounted by the support arm and also including a bearing member that supports the cylinder housing in communication with the cavity and is received within and supported for swiveling movement by the annular support; the cylinder also including a piston slidably received within the cylinder housing in a sealed relationship and having a connection to the connection location of the crank arm such that the cylinder housing swivels with respect to support arm as the piston slides within the cylinder housing to compress the suspension liquid upon jounce pivoting of the support arm in order to thereby restrict the jounce pivoting, and the suspension liquid also operating on the piston to restrict rebound pivoting of the support arm; and a positioner that extends between the stationary crank arm and the bearing member to swivel the bearing member and the cylinder housing during the jounce and rebound movement.

13. A suspension system for a road wheel of a track laying vehicle, comprising: a support arm having a hollow housing including a first end that is mounted on the vehicle for pivotal jounce and rebound movement about a support axis; the housing of the support arm including a second end for supporting a road wheel spindle and also defining a cavity for receiving a suspension liquid; a stationary crank arm received within the hollow housing of the support arm adjacent the first end thereof and having a connection location spaced from the pivotal axis of the support arm; a cylinder including a cylinder housing having a swivel bearing; the swivel bearing including an annular support mounted by the support arm and also including a bearing member that supports the cylinder housing in communication with the cavity and is received within and supported for swiveling movement by the annular support; the cylinder also including a piston slidably received within the cylinder housing in a sealed relationship and having a connection to the connection location of the crank arm such that the cylinder housing swivels with respect to support arm as the piston slides within the cylinder housing to compress the suspension liquid upon jounce pivoting of the support arm in order to thereby restrict the jounce pivoting, and the suspension liquid also operating on the piston to restrict rebound pivoting of the support arm; a positioner that extends between the stationary crank arm and the bearing member to swivel the bearing member and the cylinder housing during the jounce and rebound movement; a divider that divides the cavity of the support arm housing into a first cavity portion in direct communication with the piston of the cylinder and a second cavity portion that is communicated with the piston of the cylinder through the first cavity portion; and a valve that permits flow of the suspension liquid between the first and second cavity portions at a restricted rate to provide dampening of the jounce and rebound movement of the support arm.

* * * * *